United States Patent
Storm et al.

(10) Patent No.: US 7,272,199 B2
(45) Date of Patent: Sep. 18, 2007

(54) ADAPTIVE ADJUSTMENT OF TIME AND FREQUENCY DOMAIN EQUALIZERS IN COMMUNICATIONS SYSTEMS

(75) Inventors: Andrew Storm, Hawthorn (AU); David Wu, Melbourne (AU)

(73) Assignee: Bandspeed, Inc., Austin, TX (US)

( * ) Notice: Subject to any disclaimer, the term of this patent is extended or adjusted under 35 U.S.C. 154(b) by 586 days.

(21) Appl. No.: 10/057,133

(22) Filed: Jan. 24, 2002

(65) Prior Publication Data

US 2002/0154689 A1 Oct. 24, 2002

Related U.S. Application Data

(60) Provisional application No. 60/264,369, filed on Jan. 25, 2001.

(51) Int. Cl.
- *H04B 1/10* (2006.01)
- *H03H 7/30* (2006.01)

(52) U.S. Cl. ..................... 375/350; 375/229
(58) Field of Classification Search ........... 375/350, 375/222, 229, 231–233, 260, 346, 348; 370/210; 708/402–405
See application file for complete search history.

(56) References Cited

U.S. PATENT DOCUMENTS

| | | | | |
|---|---|---|---|---|
| 5,311,546 A | * | 5/1994 | Paik et al. | 375/232 |
| 5,513,215 A | * | 4/1996 | Marchetto et al. | 375/233 |
| 5,903,608 A | | 5/1999 | Chun | 375/260 |
| 6,243,414 B1 | * | 6/2001 | Drucker et al. | 375/222 |
| 6,408,022 B1 | * | 6/2002 | Fertner | 375/230 |
| 6,418,558 B1 | * | 7/2002 | Roberts et al. | 725/129 |
| 6,834,109 B1 | * | 12/2004 | Pare, Jr. et al. | 379/416 |

FOREIGN PATENT DOCUMENTS

EP 1 043 875 A2 10/2000

OTHER PUBLICATIONS

Jeffrey C. Strait, "Signal Processing for Multicarrier Modulation," 1988, IEEE, pp. 55-59.

* cited by examiner

*Primary Examiner*—Young T. Tse
(74) *Attorney, Agent, or Firm*—Hickman Palermo Truong & Becker LLP; Edward A. Becker

(57) ABSTRACT

An update mechanism and approach are provided for configuring a communications receiver. According to the approach, a time domain equalizer and a frequency domain equalizer in a communications receiver are dynamically updated based upon performance data that indicates the performance of a communications channel from which the communications receiver receives data. This approach accounts for changes in the communications channel attributable to changes in the transmission medium or changes in interference sources.

28 Claims, 4 Drawing Sheets

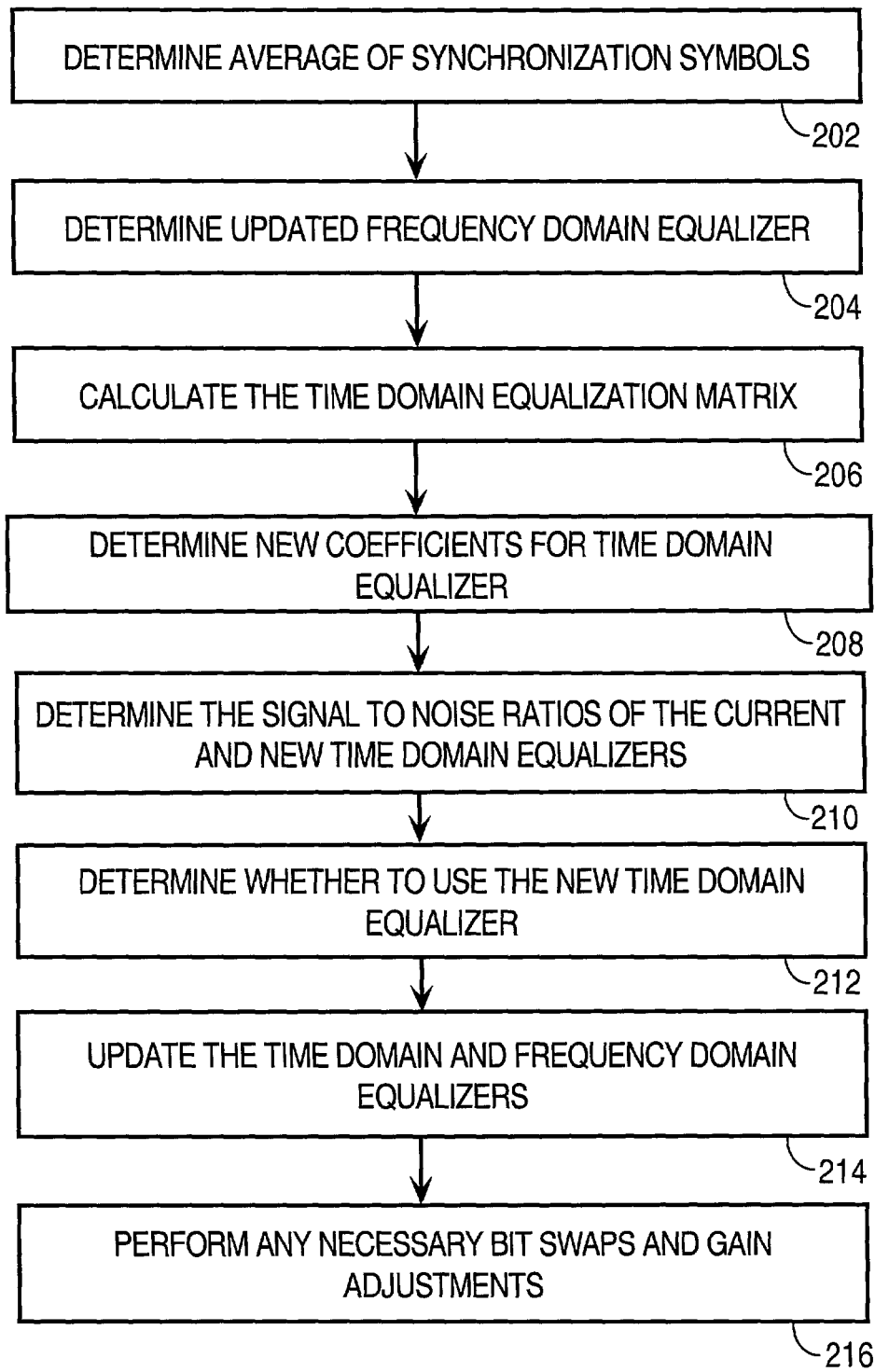

ADAPTIVE ADJUSTMENT OF TIME AND FREQUENCY DOMAIN EQUALIZERS IN COMMUNICATIONS SYSTEMS

RELATED APPLICATIONS

This application claims priority from U.S. Provisional Patent Application No. 60/264,369, entitled "Method for the Adaptive Adjustment of Time and Frequency Domain Equalizers in an ADSL/VDSL Receiver," filed Jan. 25, 2001, by A. Storm and D. Wu, the contents of which are incorporated herein by reference in its entirety for all purposes.

FIELD OF THE INVENTION

The present invention relates generally to digital communications systems, and more specifically, to an approach for adaptively adjusting time and frequency domain equalizers in digital communications systems.

BACKGROUND OF THE INVENTION

There is a continuing need for higher performance digital data communications systems. Perhaps nowhere is this need more evident than on the worldwide packet data communications network now commonly referred to as the "Internet." On the Internet, the "richness" of content is constantly increasing, requiring an ever-increasing amount of bandwidth to provide Internet content to users. As a result of this increased demand for bandwidth, significant efforts have been made to develop new types of high-speed digital data communications systems. For example, optical fiber based networks are being built in many large metropolitan areas and undersea to connect continents. As another example, new wireless protocols are being developed to provide Internet content to many different types of small, portable devices.

One of the significant drawbacks of deploying many of these new types of high-speed digital data communications systems is the high cost and amount of time required to develop and build out the new infrastructure required by the systems. Because of these high costs, many new high-speed digital data communications systems are initially deployed only in densely populated areas, where the cost of building out the new infrastructure can be quickly recovered. Less populated areas must often wait to receive the new communications systems and some rural areas never receive the new systems where it is not cost effective to build the infrastructure.

Significant efforts are being made to utilize conventional twisted pair telephone lines to provide high-speed digital data transmission. The use of twisted pair telephone lines provides two important benefits. First, a significant amount of twisted pair telephone line infrastructure already exists in many countries. Thus, using conventional twisted pair telephone lines avoids the cost of building expensive new infrastructure. Second, conventional twisted pair telephone lines extend into customers' homes and businesses, avoiding the so-called "last mile" problem. As a result of recent development efforts in this area, several new communications protocols, such as Asymmetric Digital Subscriber Line (ADSL), G.Lite and Very high speed Digital Subscriber Line (VDSL), have been developed for providing high-speed digital transmission over conventional twisted pair telephone lines.

Despite the advantages to using conventional twisted pair telephone lines to provide high-speed digital communications, there are some problems with this approach. First, conventional twisted pair telephone lines cause signal attenuation per unit length that increases rapidly with frequency. A moderate length twisted pair line, for example around fifteen thousand feet, may cause only a few decibels (dB) of attenuation in the voice band, for which the line was originally designed, but many tens of dB of attenuation at higher transmission frequencies, for example around 1.1 MHz for ADSL. This results in a transfer function with a wide dynamic range, making channel equalization more difficult. The transfer function is further complicated by bridge taps and impedance mismatches between line sections that cause reflections and echoes at the receiver. Furthermore, filtering performed at the transmitter and receiver also increases the complexity of the transfer function.

The standards for ADSL and G.Lite specify Discrete Multitone (DMT) modulation. DMT is also under consideration for use in VDSL systems. DMT modulation generally involves transmitting digital data on a number of carriers simultaneously. Modulation and demodulation are performed using a Fast Fourier Transform (FFT). A cyclic prefix is introduced to ensure separation between successive DMT symbols and eliminate inter-symbol interference (ISI). In practice, the cyclic prefix is necessarily quite short, generally much shorter than the impulse response of the communications channel. This often results in significant ISI being present in the received data. Large amounts of ISI cause a large reduction in the available communications bandwidth. This is especially true for long twisted pair telephone lines likely to be encountered in ADSL and VDSL communications systems. The effect of this ISI is to reduce the Signal-to-Noise Ratio (SNR) in each bin of the FFT demodulator employed in a DMT system.

Standard equalizers used in digital communication systems, such as adaptive Least Means Squares (LMS) and Recursive Least Squares (RLS) equalizers, are generally inappropriate for DMT systems since they do not adequately shorten the communications channel impulse response and thereby fail to sufficiently eliminate ISI. Some attempts have been made to shorten the overall channel plus equalizer impulse response to be less than the cyclic prefix length. See for example, *A Multicarrier Primer*, by J. M. Cioffi; and *Impulse Response Shortening for Discrete Multitone Transceivers*, by P. Melsa, R. Younce and C. Rohrs, IEEE Transactions on Communications, Vol. 44, No. 12, Dec. 1996.

In addition to the equalization problem, twisted pair lines suffer from various forms of interference. Up to fifty twisted pairs are conventionally grouped together in binders. As a result, a signal on one pair can cause interference on other pairs in the same binder. This interference is called crosstalk and causes a reduction in the SNR at the receiver. Current approaches to mitigate crosstalk require access to the signal transmitted on the interfering line. This makes current approaches useful only in a central office environment, where the signals on all pairs in a binder are available. Thus, none of the existing crosstalk mitigation approaches are suitable when only the received signal is available. The foregoing problems are exacerbated in dynamic communications environments. For example, equalizer performance may be further degraded by changes on the transmission medium, e.g., the transmission line, attributable to temperature changes or changes in the interference sources.

Based on the foregoing, there is a need for an approach for processing data received from a communications channel that does not suffer from the limitations of conventional approaches.

SUMMARY OF THE INVENTION

An update mechanism and approach are provided for configuring a communications receiver. According to the approach, a time domain equalizer and a frequency domain equalizer in a communications receiver are dynamically updated based upon performance data that indicates the performance of a communications channel from which the communications receiver receives data. This approach accounts for changes in the communications channel attributable to changes in the transmission medium or changes in interference sources, and is particular useful in digital subscriber line (DSL) applications.

According to one aspect of the invention a communications receiver is provided. The communications receiver includes a time domain equalizer, a frequency domain equalizer and an update mechanism configured to update both the time domain equalizer and the frequency domain equalizer based upon performance data that indicates performance of a communications channel from which the communications receiver receives data.

According to another aspect of the invention, an update mechanism is provided and configured to update both a time domain equalizer and a frequency domain equalizer in a communications receiver based upon performance data that indicates performance of a communications channel from which the communications receiver receives data.

According to another aspect of the invention, a method is provided for configuring a communications receiver. The method includes updating both a time domain equalizer and a frequency domain equalizer contained in the communications receiver based upon performance data that indicates performance of a communications channel from which the communications receiver receives data.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2 is a flow diagram that depicts an approach for configuring and updating a communications receiver according to an embodiment of the invention;

DETAILED DESCRIPTION OF THE INVENTION

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Various aspects and features of the approach described herein for processing data received from a communications channel are described in more detail in the following sections: (1) Functional Overview; (2) Architecture Overview; (3) Mathematical Overview; (4) Dynamically Updating the Time Domain and Frequency Domain Equalizers; and (5) Implementation Mechanisms.

I. Functional Overview

An update mechanism and approach are provided for configuring a communications receiver. According to the approach, a time domain equalizer and a frequency domain equalizer in a communications receiver are dynamically updated based upon performance data that indicates the performance of a communications channel from which the communications receiver receives data. This approach accounts for changes in the communications channel attributable to changes in the transmission medium or changes in interference sources, and is particular useful in digital subscriber line (DSL) applications.

II. Architecture Overview

Figure 1:
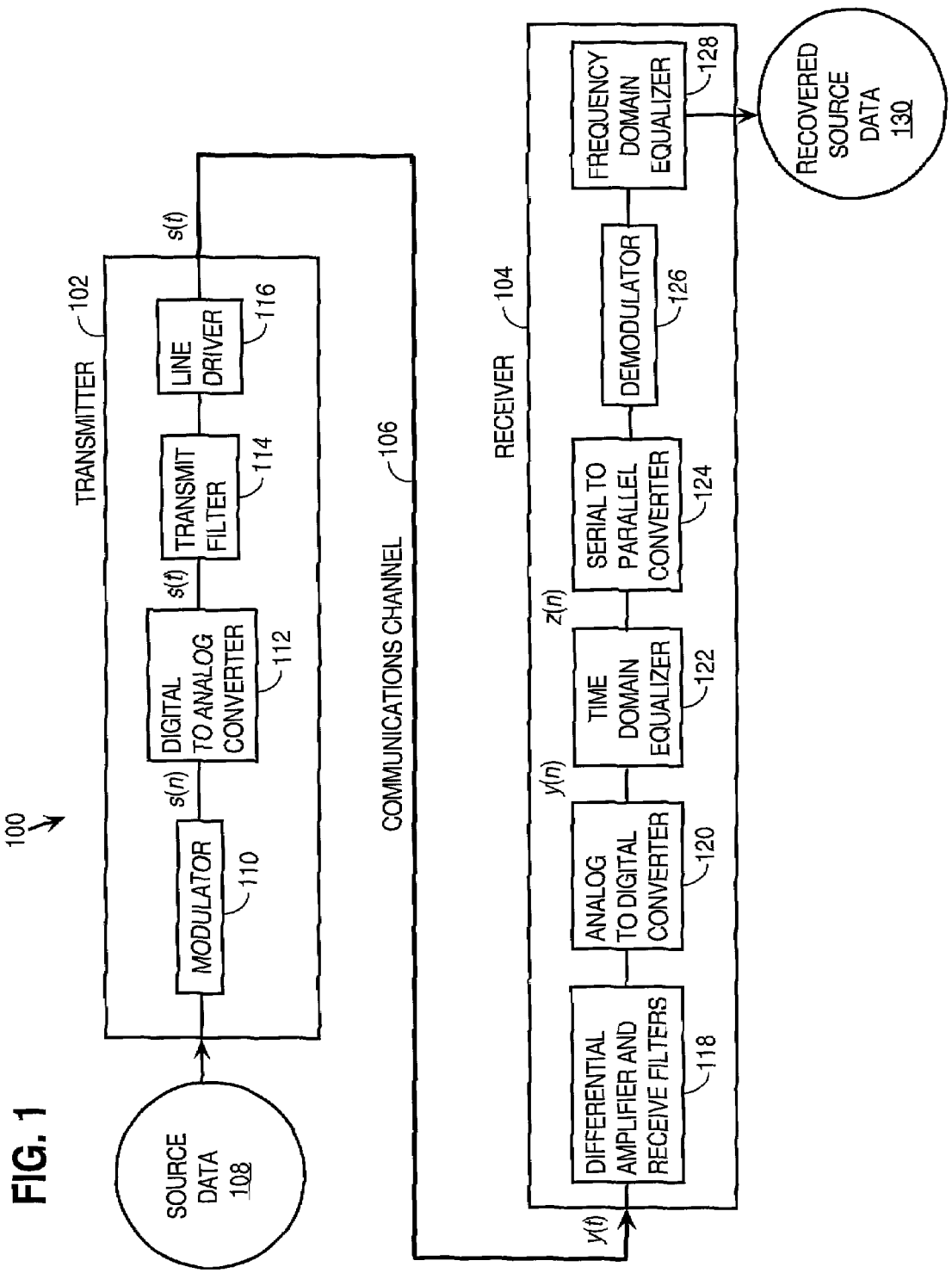
FIG. 1 is a block diagram that depicts a digital data communications arrangement to which embodiments of the invention may be applied.

FIG. 1 is a block diagram of a communications system arrangement 100 to which embodiments of the invention may be applied. Arrangement 100 includes a transmitter 102 communicatively coupled to a receiver 104 via a communications channel 106. Communications channel 106 may be any type of medium or mechanism for providing data from transmitter 102 to receiver 104. For purposes of explanation only, various embodiments of the invention are described herein in the context of communications channel 106 as a landline, such as one or more conventional twisted pair telephone lines.

Transmitter 102 receives digital source data 108, e.g., a digital stream, that is modulated by a modulator 110 to generate a sampled data signal s(n), where n is the sample number, and the sampling rate is given by $F_s$. The sampled data signal s(n) is converted to an analog signal s(t) by an digital to analog converter 112. The analog signal s(t) is processed by a transmit filter 114 to remove unwanted components from the analog signal s(t). The analog signal s(t) is then amplified by a line driver 116 and transmitted onto communications channel 106. It should be noted that the transmitted analog signal s(t) is not strictly a continuous time representation of the sampled data signal s(n) since transmit filter 114 modifies the signal, but is represented as such herein for the purposes of explanation.

The transmitted analog signal s(t) passes through communications channel 106, which has an impulse response of h(t) and corresponding transfer function H(f). The output of communications channel 106 x(t) is the convolution of the transmitted analog signal s(t) and the channel impulse response h(t), given by $$x(t)=s(t)*h(t) \tag{1}$$

The signal received by receiver 104 y(t) is the sum of the output of communications channel 106 x(t) and an additive noise signal w(t), given by $$y(t)=x(t)+w(t) \tag{2}$$

where the additive noise signal w(t) consists of any form of interference introduced by communications channel 106, for example crosstalk, and an additive white Gaussian noise component.

A differential amplifier and receive filters 118 process the received signal y(t) to generate an amplified and filtered (to remove undesired components) signal y(t). An analog-to-digital converter 120 samples the amplified and filtered signal y(t) to generate a digital signal y(n) which at this point is still modulated. It should be pointed out that y(n) is not strictly a sampled version of y(t) due to the processing of receive filters 120 which modify the signal, but is represented as such herein for the purposes of explanation.

A time domain equalizer 122 processes the digital signal y(n) in the time domain to remove ISI and recover the transmitted modulated data z(n). The modulated data z(n) is processed by a serial to parallel converter 124 and then by a demodulator 126, e.g., via an FFT, to generate recovered source data 130, which ideally very closely approximates source data 108. Transmitter 102 and receiver 104 may include other components not included here for purposes of explanation, for example, an encoder and decoder, respectively.

III. Mathematical Overview

For purposes of explanation, the process of modulation, transmission and demodulation may be described mathematically as follows. Let the $l^{th}$ transmitted symbol be $c_l$. This is a vector consisting of N complex numbers: $c_l = (c_{lk})_{k=0}^{N-1}$. For ADSL applications, N=256 downstream and N=32 upstream. Each component $C_{lk}$ is a point in a constellation of $2^{b_k}$ points. From $c_l$, a vector $d_l = (d_{lk})_{k=0}^{M-1}$ containing M=2N points is created having Hermitian symmetry. That is, $d_{l0}$ and $d_{lN}$ are real numbers, and $d_{l,M-k} = d_{lk}^*$ for $1 \leq k \leq N-1$. In ADSL applications, $d_{l0} = d_{lN} = 0$ and $d_{lk} = g_k c_{lk}$ for $1 \leq k \leq N-1$. The real factor $g_k$ is a fine gain factor used to equalize bit error rates between tones. Modulation is achieved by taking the inverse FFT of $d_l$. This creates the real vector $x_l$ with components $$x_{lr} = \frac{1}{M} \sum_{k=0}^{M-1} d_{lk} \exp\left(\frac{2\pi i r k}{M}\right)$$

Note that $x_{lr}$ is periodic in r, with period M. The transmitted analog signal is created by passing the vector $(x_{lr})_{r=-c}^{M-1}$ through a parallel to serial converter and digital to analogue converter:

$$x(t) = \sum_{l} \sum_{r=-c}^{M-1} x_{lr} p(t - (r+c)T - (M+c)lT)$$

Through the periodicity of $x_{lr}$, the first c samples in a block are equal to the last c—an effect known as a cyclic prefix. For ADSL applications, c=32 downstream and c=4 upstream. Also, 1/T=2.208 MHz upstream and 1/T=276 kHz downstream. The transmitted pulse shape p(t) includes the effect of any transmit filters.

According to the ADSL standard, data is grouped into frames. Each frame is encoded into a DMT symbol, modulated and transmitted. A synchronization symbol is transmitted after every 68 frames of data. The combination of the 68 frames of data and the synchronization symbol is known as a superframe. The synchronization symbol $(s_k)_{k=0}^{N-1}$ is obtained from a pseudo-random sequence and does not change from one superframe to the next superframe. The fine gain factors are not applied to the synchronization symbol.

At the receiver, the received signal is filtered and sampled to create the discrete time signal $y_t$, which is filtered by the time domain equalizer (TDEQ) to produce $z_t$. If the TDEQ coefficients are $\phi_0 \ldots \phi_p$ then $$z_t = \sum_{n=1}^{p} \varphi_n y_{t-n}.$$

The signal $z_t$ is split into blocks of length M+c, possibly with a timing offset $\theta$: $Z_{ms} = Z_{\theta+(s+c)+(M+c)m}$ for $-c \leq s \leq M$. The first c samples are removed and the remainder demodulated by taking an FFT:

$$Z_{mk} = \sum_{s=0}^{M-1} Z_{ms} \exp\left(-\frac{2\pi i k s}{M}\right).$$

The frequency domain equalizer (FDEQ) re-maps this demodulated symbol by multiplying $Z_{mk}$ by a complex number $F_k$. The result is input to a decoder to retrieve the transmitted data.

IV. Dynamically Updating the Time Domain and Frequency Domain Equalizers

As briefly indicated herein, the approach generally involves updating a time domain equalizer and a frequency domain equalizer based upon communications channel performance data. The communications channel performance data is described hereinafter in accordance with an embodiment of the invention in the context of using synchronization symbols to evaluate the performance of the communications channel. The synchronization symbols may be used with "real" data, or with training data, depending upon the requirements of a particular application. The invention, however, is not limited to the use of synchronization symbols and any approach may be used to determine the performance of the communications channel and then adjust the time domain and frequency domain equalizers based upon the performance of the communications channel.

A synchronization symbol is data that is known to the receiver and transmitted over the communications channel with other data. Since the synchronization symbol is known to the receiver, the receiver can determine the performance of the communications channel.

FIG. 2 is a flow diagram 200 of an approach for updating time domain and frequency domain equalizers according to an embodiment of the invention. In step 202, an average of the synchronization symbols is determined. In step 204, an updated frequency domain equalizer 128 is determined based upon the average of the synchronization symbols. In step 206, the equalization matrix for time domain equalizer 122 is determined. In step 208, new coefficients are determined for time domain equalizer 122. In step 210, the signal to noise ratios are determined 210. In step 212, a determination is made which equalizer is to be used, e.g., staying with the existing equalizer coefficients, or implementing the new equalizer coefficients. In step 214, the time domain and frequency domain equalizers are updated if appropriate. In step 216, any necessary bit swaps and fine gain adjustments are made as appropriate. Each of these steps is described in more detail hereinafter.

A. Determine Average of Synchronization Symbols

For a block of n consecutive superframes, let $U_{mk}$ be the $k^{th}$ tone in the $m^{th}$ demodulated synchronization symbol (prior to frequency domain equalization) in this block. The synchronization symbols are averaged to obtain $$\overline{U}_k = \frac{1}{n}\sum_{m=1}^{n} U_{mk}$$

B. Determine Updated Frequency Domain Equalizer

Let $S_k$ be the transmitted point on the $k^{th}$ tone in the synchronization symbol. Let $F_k = S_k/\overline{U}_k$ and multiply by $F_k$ on the $k^{th}$ tone to perform the frequency domain equalization. It may be necessary to perform further scaling before decoding to compensate for the fine gain factors and any other constellation scaling performed by transmitter 102.

C. Calculate the Time Domain Equalization Matrix

Let the number of time domain equalizer taps be p+1. Let $\phi_{10}, \ldots \phi_{1p}$ be the current set of coefficients for time domain equalizer 122 and let $(\Phi_{1k})_{k=0}^{M-1}$ be the frequency response of time domain equalizer 122, where $(\Phi_{1k})_{k=0}^{M-1}$ is the M point FFT of $\phi_{10}, \ldots \phi_{1p}$. $A_k = \overline{U}_k/\Phi_{1k}$ and the inverse FFT are determined to obtain the real sequence $$a_t = (1/M)\sum_{k=0}^{M-1} A_k \exp(2\pi i t k/M).$$

Let $(y_{mt})_{t=-c}^{M-1}$ be the $m^{th}$ synchronization symbol prior to equalization. Thus $$u_{mt} = \sum_{j=0}^{p} \varphi_{1j} y_{t-j}$$

is the equalized $m^{th}$ synchronization symbol prior to demodulation, and $U_{mk}$ is the FFT of $u_{mt}$. The (p+1)×(p+1) equalization matrix is determined with entries $$G_{kl} = \frac{1}{n}\sum_{m=1}^{n}\sum_{t=0}^{M-1}(y_{m,t-k} - a_{t-k})(y_{m,t-l} - a_{t-l}),\ 0 \le k, l \le p$$

D. Determine New Time Domain Equalizer

The new equalizer coefficients are computed to minimize the quadratic form $\phi'G\phi$ under the constraint $\phi_0=1$. If the matrix G is partitioned as $$G = \begin{bmatrix} r & f' \\ f & F \end{bmatrix}$$

where r is a scalar, $f$ is p×1 and F is p×p, then the new equalizer is $\phi_2=(1,\zeta')'$ where $\zeta$ solves $F\zeta=-f$. The time domain equalizer coefficients may also be re-scaled by multiplying by a constant. This does not affect the signal to noise ratios.

E. Determine the Signal to Noise Ratios When Using the Current and New Time Domain Equalizers According to one embodiment of the invention, the SNRs are determined when using the current and new time domain equalizers so that a determination can be made whether to continue using the current set of time domain equalizer coefficients or switch to the new set of coefficients. This involves determining the SNR when using a time domain equalizer with the current coefficients and determining the SNR when using a time domain equalizer with the new coefficients. Consider a second block of n consecutive superframes. Using the current equalizer $\phi_1$, let $U_{mk}$ be the $k^{th}$ tone on the $m^{th}$ demodulated synchronization symbol as before. Calculate $$\overline{U}_k = \frac{1}{n}\sum_{m=1}^{n} U_{mk}$$

and $$V_k = \frac{1}{n}\sum_{m=1}^{n} |U_{mk} - \overline{U}_k|^2.$$

The signal to noise ratios under the current equalizer are $SNR_{1k}=|\overline{U}_k|^2/V_k$. To calculate the signal to noise ratios under the new equalizer, let $(y_{mt})_{t=-c}^{M-1}$ be the $m^{th}$ synchronization symbol prior to equalization. Filter $y_{mt}$ by $\phi_2$ to obtain $$w_{mt} = \sum_{j=0}^{p} \varphi_{2j} y_{m,t-j}.$$

Then demodulate $w_{mt}$ to obtain $$W_{mk} = \sum_{t=0}^{M-1} w_{mt}\exp(-2\pi i kt/M).$$

Calculate $$\overline{W}_k = \frac{1}{n}\sum_{m=1}^{n} W_{mk}$$

and $$X_k = \frac{1}{n}\sum_{m=1}^{n} |W_{mk} - \overline{W}_k|^2.$$

The signal to noise ratios under the new equalizer are $SNR_{2k}=|\overline{W}_k|^2/X_k$.

F. Determine Whether to Use the New Equalizer

Once the SNRs have been determined for the current and new sets of equalizer coefficients, a determination is made whether to use the new set of equalizer coefficients or continue to use the existing set of equalizer coefficients. Let T be the set of tones on which the fine gain factor is non-zero. According to one embodiment of the invention, this set of tones is defined during initialization and is not changed by any bit swap routines. Let K be the number of tones in T. To decide which equalizer to use, count the number of tones within T on which $SNR_{2k}>SNR_{1k}$, i.e. compute $N=\Sigma_{k \in T}I(SNR_{2k}>SNR_{1k})$, where I(condition) equals 1 if the condition is true, and zero otherwise. Then use the new equalizer in preference to the old if N satisfies a threshold value. According to one embodiment of the invention, the new set of equalizer coefficients is used in place of the current set of equalizer coefficients if $$N > \frac{K}{2} + \frac{z}{2}\sqrt{K}$$

where z is the upper (1−α) percentile of the normal distribution. For a 5% confidence level test z=1.64. For a 10% confidence level test z=1.28. The reasoning behind this test, which is a simple sign test, is as follows. Under the null hypothesis that the new equalizer coefficients is no better than the current equalizer coefficients, and assuming independence of signal to noise ratios between tones, N will have a binomial distribution with probability of success ½, so E(N)=K/2 and V(N)=K/4. We reject this null hypothesis in favor of the alternative, i.e., that the new equalizer coefficients are better than the current set of equalizer coefficients, if N is sufficiently large. According to one embodiment of the invention, the threshold level is determined by the normal approximation: $(N-K/2)/\sqrt{K/4} \sim N(0,1)$, so the null hypothesis is rejected if $(N-K/2)/\sqrt{K/4}>z$ where $P(Z>z)=\alpha$ if $Z \sim N(0,1)$. This provides the necessary test.

G. Update the Time Domain and Frequency Domain Equalizers

Based upon the foregoing test, a determination is made whether to continue to use the current set of time domain equalizer coefficients or switch to the new set of time domain equalizer coefficients. The frequency domain equalizer is updated if decision is made to use the new set of time domain equalizer coefficients. The frequency domain equalizer may also be updated if a determination is made to continue using the current set of time domain equalizer coefficients. If a decision is made to continue to use the existing time domain equalizer coefficients, then set $F_k=S_k/U_k$. If the new time domain equalizer coefficients are implemented, then set $F_k=S_k/W_k$.

H. Perform Any Necessary Bit Swaps and Gain Adjustments

Once the time domain and frequency domain equalizers have been updated, any necessary bit swaps and gain adjustments are made in accordance with the current signal to noise ratios $SNR_{1k}$ or $SNR_{2k}$ as appropriate. According to one embodiment of the invention, the bit swaps and/or gain adjustments are made using an appropriate DSL bit swap mechanism to reallocate bits among the tones.

V. Implementation Mechanisms

Figure 3A:
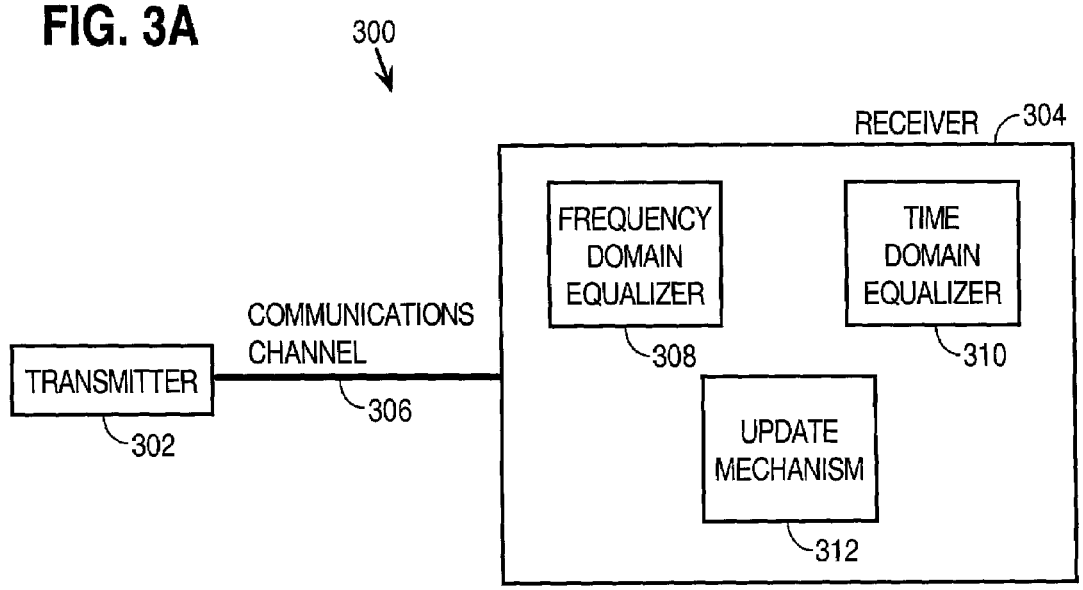
FIG. 3A is a block diagram that depicts a communications receiver arrangement on which embodiments of the invention may be implemented.
Figure 3B:
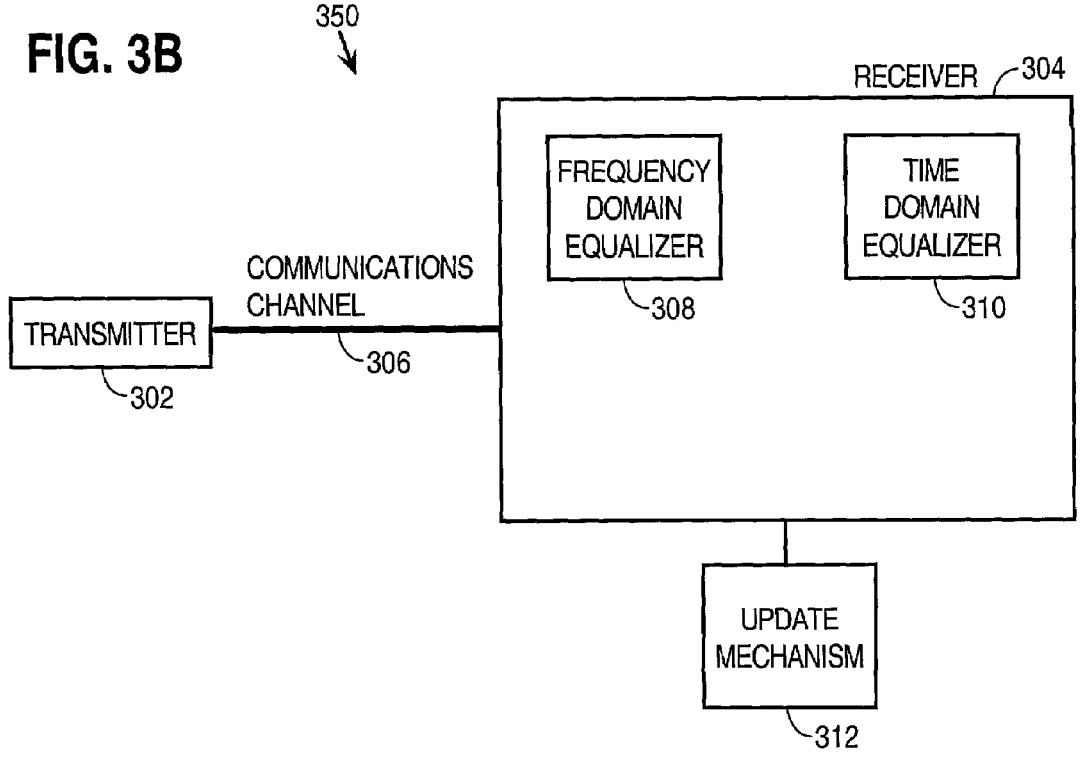
FIG. 3B is a block diagram that depicts another communications receiver arrangement on which embodiments of the invention may be implemented.

The approach described herein for updating time domain and frequency domain equalizers may be implemented in a receiver, such as receiver 104, or may be implemented into a stand-alone mechanism. Furthermore, the approach may be implemented in computer software, in hardware circuitry, or as a combination of computer software and hardware circuitry. Accordingly the invention is not limited to a particular implementation. For example, FIG. 3A is a block diagram that depicts a communications receiver arrangement 300 on which embodiments of the invention may be implemented. In arrangement 302, a transmitter communicates with a receiver 304 via a communications channel 306. Receiver 304 includes a frequency domain equalizer 308, a time domain equalizer 310 and an update mechanism 312. According to one embodiment of the invention, update mechanism 312 is configured to update frequency domain equalizer 308, time domain equalizer 310, or both, using the approach described herein. As depicted in FIG. 3A update mechanism 312 is integrated into receiver 304. As depicted in FIG. 3B, in communications receiver arrangement 350, update mechanism is implemented as a separate mechanism that is communicatively coupled to receiver 304.

The timing of when time domain and frequency domain equalizers are updated according the approach described herein may be based upon a variety of factors, depending upon the requirements of a particular application, and the invention is not limited to any particular approach. For example, the approach may be implemented so that the analysis and updates are performed on a periodic basis. It may be advantageous to implement the approach during a time when a communications system is known to be inactive to reduce the adverse effects on performance attributable to updating the time domain and frequency domain equalizers. As another example, the approach may be initiated based upon external factors that indicate that there has been a change in a condition of a transmission line or a change in an interference source.

Figure 4:
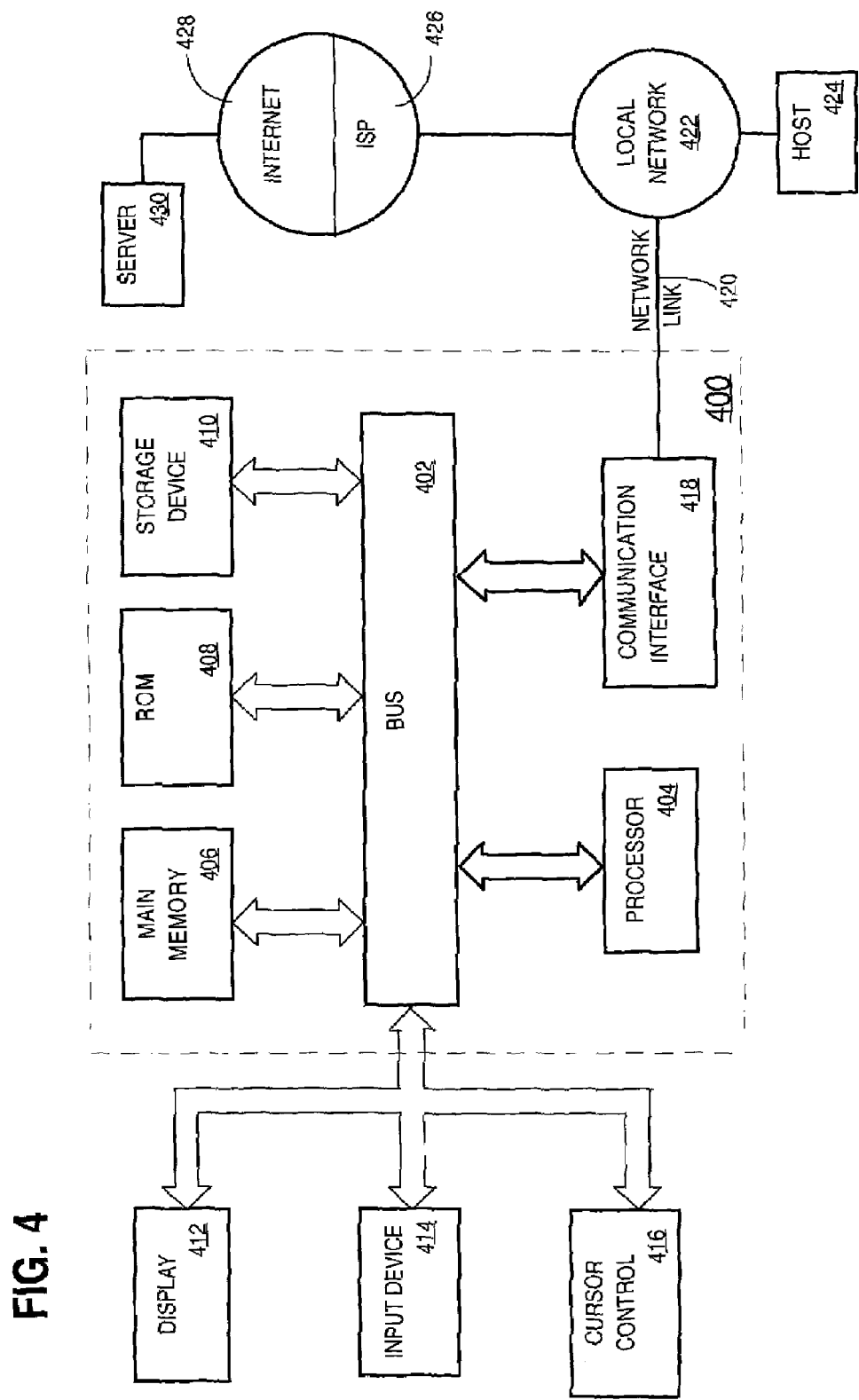
FIG. 4 is a block diagram that depicts a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for dynamically updating time domain and frequency domain equalizers in a communications receiver based upon performance data that indicates the performance of a communications channel from which the communications receiver receives data. According to one embodiment of the invention, the dynamic updating time domain and frequency domain equalizers in a communications receiver based upon performance data that indicates the performance of a communications channel from which the communications receiver receives data is performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for dynamically updating time domain and frequency domain equalizers in a communications receiver based upon performance data that indicates the performance of a communications channel from which the communications receiver receives data as described herein.

The received code may be executed by processor 404 as it is received, and/or stored in storage device 410, or other non-volatile storage for later execution. In this manner, computer system 400 may obtain application code in the form of a carrier wave.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A communications receiver comprising:
    a time domain equalizer;
    a frequency domain equalizer; and
    an update mechanism configured to update both the time domain equalizer and the frequency domain equalizer based upon performance of a communications channel from which the communications receiver receives data, wherein updating the time domain equalizer includes
        causing the time domain equalizer to operate with a first set of coefficients,
        determining first performance data that reflects performance of the time domain equalizer when the time domain equalizer is operating with the first set of coefficients,
        changing the coefficients used by the time domain equalizer so that the time domain equalizer operates with a second set of coefficients,
        determining second performance data that reflects performance of the time domain equalizer when the time domain equalizer is operating with the second set of coefficients,
        selecting for use by the time domain equalizer, based upon the first performance data and the second performance data, either the first set of coefficients or the second set of coefficients, if the first set of coefficients is selected for use, then changing the coefficients used by the time domain equalizer so that the time domain equalizer operates with the first set of coefficients, and if the second set of coefficients is selected for use, then causing the time domain equalizer to continue to operate with the second set of coefficients.

2. The communications receiver as recited in claim 1, wherein the update mechanism is further configured to determine the first and second performance data based upon synchronization symbols received by the communications receiver.

3. The communications receiver as recited in claim 1, wherein the communications receiver is a digital subscriber line communications receiver.

4. The communications receiver as recited in claim 1, wherein the communications receiver is part of a discrete multitone communications system.

5. The communications receiver as recited in claim 1, wherein:

the first performance data reflects one or more signal to noise ratios of data received by the communications receiver when the time domain equalizer is operating with the first set of coefficients; and the second performance data reflects one or more signal to noise ratios of data received by the communications receiver when the time domain equalizer is operating with the second set of coefficients.

6. The communications receiver as recited in claim 1, wherein:

the communications receiver uses an initial bit allocation; and the update mechanism is further configured to determine an updated bit allocation based upon the first and second performance data, and cause the communications receiver to use the updated bit allocation.

7. The communications receiver as recited in claim 1, wherein the update mechanism is further configured to perform gain adjustments on tones based upon the first and second performance data.

8. An update mechanism configured to:

update both a time domain equalizer and a frequency domain equalizer in a communications receiver based upon performance of a communications channel from which the communications receiver receives data, wherein updating the time domain equalizer includes causing the time domain equalizer to operate with a first set of coefficients, determining first performance data that reflects performance of the time domain equalizer when the time domain equalizer is operating with the first set of coefficients, changing the coefficients used by the time domain equalizer so that the time domain equalizer operates with a second set of coefficients, determining second performance data that reflects performance of the time domain equalizer when the time domain equalizer is operating with the second set of coefficients, selecting for use by the time domain equalizer, based upon the first performance data and the second performance data, either the first set of coefficients or the second set of coefficients, if the first set of coefficients is selected for use, then changing the coefficients used by the time domain equalizer so that the time domain equalizer operates with the first set of coefficients, and if the second set of coefficients is selected for use, then causing the time domain equalizer to continue to operate with the second set of coefficients.

9. The update mechanism as recited in claim 8, wherein the update mechanism is further configured to determine the first and second performance data based upon synchronization symbols received by the communications receiver.

10. The update mechanism as recited in claim 8, wherein the communications receiver is a digital subscriber line communications receiver.

11. The update mechanism as recited in claim 8, wherein the communications receiver is part of a discrete multitone communications system.

12. The update mechanism as recited in claim 8, wherein:

the first performance data reflects one or more signal to noise ratios of data received by the communications receiver when the time domain equalizer is operating with the first set of coefficients; and the second performance data reflects one or more signal to noise ratios of data received by the communications receiver when the time domain equalizer is operating with the second set of coefficients.

13. The update mechanism as recited in claim 8, wherein:

the communications receiver uses an initial bit allocation; and the update mechanism is further configured to determine an updated bit allocation based upon the first and second performance data, and cause the communications receiver to use the updated bit allocation.

14. The update mechanism as recited in claim 8, wherein the update mechanism is further configured to perform gain adjustments on tones based upon the first and second performance data.

15. A method for configuring a communications receiver comprising:

updating both a time domain equalizer and a frequency domain equalizer contained in the communications receiver based upon performance of a communications channel from which the communications receiver receives data, wherein updating the time domain equalizer includes causing the time domain equalizer to operate with a first set of coefficients, determining first performance data that reflects performance of the time domain equalizer when the time domain equalizer is operating with the first set of coefficients, changing the coefficients used by the time domain equalizer so that the time domain equalizer operates with a second set of coefficients, determining second performance data that reflects performance of the time domain equalizer when the time domain equalizer is operating with the second set of coefficients, selecting for use by the time domain equalizer, based upon the first performance data and the second performance data, either the first set of coefficients or the second set of coefficients, if the first set of coefficients is selected for use, then changing the coefficients used by the time domain equalizer so that the time domain equalizer operates with the first set of coefficients, and if the second set of coefficients is selected for use, then causing the time domain equalizer to continue to operate with the second set of coefficients.

16. The method as recited in claim 15, further comprising determining the first and second performance data based upon synchronization symbols received by the communications receiver.

17. The method as recited in claim 15, wherein the communications receiver is a digital subscriber line communications receiver.

18. The method as recited in claim 15, wherein the communications receiver is part of a discrete multitone communications system.

19. The method as recited in claim 15, wherein:
the first performance data reflects one or more signal to noise ratios of data received by the communications receiver when the time domain equalizer is operating with the first set of coefficients; and
the second performance data reflects one or more signal to noise ratios of data received by the communications receiver when the time domain equalizer is operating with the second set of coefficients.

20. The method as recited in claim 15, wherein:
the communications receiver uses an initial bit allocation; and
the method further comprises
determining an updated bit allocation based upon the first and second performance data, and
causing the communications receiver to use the updated bit allocation.

21. The method as recited in claim 15, further comprising performing gain adjustments on tones based upon the first and second performance data.

22. A computer-readable medium for configuring a communications receiver, the computer-readable medium carrying instructions which,
when processed by one or more processors, cause:
updating both a time domain equalizer and a frequency domain equalizer contained in the communications receiver based upon performance of a communications channel from which the communications receiver receives data, wherein updating the time domain equalizer includes
causing the time domain equalizer to operate with a first set of coefficients,
determining first performance data that reflects performance of the time domain equalizer when the time domain equalizer is operating with the first set of coefficients,
changing the coefficients used by the time domain equalizer so that the time domain equalizer operates with a second set of coefficients.
determining second performance data that reflects performance of the time domain equalizer when the time domain equalizer is operating with the second set of coefficients,
selecting for use by the time domain equalizer, based upon the first performance data and the second performance data, either the first set of coefficients or the second set of coefficients,
if the first set of coefficients is selected for use, then changing the coefficients used by the time domain equalizer so that the time domain equalizer operates with the first set of coefficients, and
if the second set of coefficients is selected for use, then causing the time domain equalizer to continue to operate with the second set of coefficients.

23. The computer-readable medium as recited in claim 22, further comprising one or more additional instructions which, when processed by the one or more processors, cause determining the first and second performance data based upon synchronization symbols received by the communications receiver.

24. The computer-readable medium as recited in claim 22, wherein the communications receiver is a digital subscriber line communications receiver.

25. The computer-readable medium as recited in claim 22, wherein the communications receiver is part of a discrete multitone communications system.

26. The computer-readable medium as recited in claim 22, wherein:
the first performance data reflects one or more signal to noise ratios of data received by the communications receiver when the time domain equalizer is operating with the first set of coefficients; and
the second performance data reflects one or more signal to noise ratios of data received by the communications receiver when the time domain equalizer is operating with the second set of coefficients.

27. The computer-readable medium as recited in claim 22, wherein:
the communications receiver uses an initial bit allocation; and
the computer-readable medium further comprises one or more additional instructions which, when processed by the one or more processors, causes
determining an updated bit allocation based upon the first and second performance data, and
causing the communications receiver to use the updated bit allocation.

28. The computer-readable medium as recited in claim 22, further comprises one or more additional instructions which, when processed by the one or more processors, causes performing gain adjustments on tones based upon the first and second performance data.

* * * * *